United States Patent [19]
Williams

[11] Patent Number: 5,870,513
[45] Date of Patent: Feb. 9, 1999

[54] BIDIRECTIONAL CABLE NETWORK WITH A MIXING TAP FOR SUPPRESSING UNDESIRABLE NOISE IN SIGNALS FROM A REMOTE END OF THE NETWORK

[75] Inventor: Thomas H. Williams, Longmont, Colo.

[73] Assignee: Cable Television Laboratories, Inc., Louisville, Colo.

[21] Appl. No.: 877,462

[22] Filed: Jun. 17, 1997

[51] Int. Cl.[6] .................................................. G02B 6/293
[52] U.S. Cl. .......................... 385/24; 359/113; 359/115; 359/154; 455/4.2; 455/5.1; 455/63; 455/296
[58] Field of Search .................... 385/15, 24, 27; 359/113–115, 118, 119, 123–125, 127, 135–137, 154, 158, 162, 164–167; 455/5.2, 5.1, 63, 296, 307–311

[56] References Cited

U.S. PATENT DOCUMENTS

| | | | |
|---|---|---|---|
| 5,134,723 | 7/1992 | Carson | 455/254 |
| 5,150,365 | 9/1992 | Hirata et al. | 370/123 |
| 5,255,267 | 10/1993 | Hansen et al. | 370/85.1 |
| 5,453,868 | 9/1995 | Blauvelt et al. | 359/173 |
| 5,742,591 | 4/1998 | Himayat et al. | 370/286 |
| 5,745,836 | 4/1998 | Williams | 455/5.1 |

OTHER PUBLICATIONS

1996 Conference on Emerging Technologies by the Society of Cable Telecommunications Engineers held in San Francisco, CA on Jan. 8–10, 1996; authors are Brian Johanson, Bob Chamberlin, and Aravaman Gurusami; Title: HFC Return System: Management of Subscribing–Induced noise; pp. 263–268.

*Primary Examiner*—John D. Lee
*Attorney, Agent, or Firm*—Duft, Graziano & Forest, P.C.

[57] ABSTRACT

Noise energy and other undesirable signals are suppressed in a return frequency band of a return path of a bidirection cable network. Data signals in a third frequency band and a prybar signal are transmitted on a user site to a mixing tap. The mixing tap contains a filter for eliminating signals in the return frequency band generated at the user site. The prybar signal is received by the mixing tap and activates a local oscillator. The third band signals and oscillation signals are applied to a mixer in the mixing tap and the third band signals are converted to return band signals. This mixing tap then applies the return band to the return path of the cable network.

16 Claims, 2 Drawing Sheets

BIDIRECTIONAL CABLE NETWORK WITH A MIXING TAP FOR SUPPRESSING UNDESIRABLE NOISE IN SIGNALS FROM A REMOTE END OF THE NETWORK

FIELD OF THE INVENTION

This invention relates to the suppression of undesirable noise in signals transmitted from a remote point to a headend of a bidirectional communication network. More particularly, the present invention relates to the suppressing of noise signals before the noise signals enter a return path of the network. Still more particularly, the present invention relates to the transmitting of data signals outside a return frequency band and then mixing the data signals to convert them to network return frequency band for transmission over the return path.

PROBLEM

Existing cable networks typically include a bidirectional communication path between a network headend and a plurality of remote points. An example of a bidirectional communication path is a single coaxial cable carrying broadband Radio Frequency (RF) signals in two directions. The headend transmits signals to the remote points in a first, "forward," or "downstream" direction. A second, or "return" direction carries signals transmitted by the remote points to the headend. The bidirectional communication path carries signals in the two directions by dividing the frequency spectrum into two frequency bands. The headend signals are transmitted to the remote points in a forward frequency band of about 54–750 MHZ and the signals transmitted from the remote points to the headend are transmitted in a return frequency band of about 5–40 MHZ.

The signals transmitted by the headend typically enjoy good integrity because the headend delivers a high quality signal from a controlled source. These high quality signals from the headend at 54–750 MHZ are distinguishable from return signals having undesirable energy and a noise floor occurring at or about 5–30 MHZ. It is often not a concern to suppress undesirable energy from the headend signals.

Remote points, such as private homes, are uncontrolled noise producing sources. Each remote point generally contains multiple origination points for undesirable energy, including but not limited to switched conductive loads, citizen band radio transmitters, and devices using radio signals, such as garage door openers, remote controls, and security systems. Undesirable energy or noise created at these origination points enters the network return path through weak points in the network, which typically occur near the remote points. Weak points include but are not limited to unshielded, improperly connected, corroded or broken co-axial cables near the remote point. The multiple noise origination points and a greater number of weak point near the remote end allow great amounts of undesirable energy to enter the system at the remote point.

Noise entering the network at the remote point produces noise energy in the entire return frequency band. Noise is especially intense in the 5–15 MHZ range of the return band. The noise results in return data signals in 5–15 MHZ range being affected by the noise so that the signals transmitted from the remote point do not enjoy the good integrity of the signals transmitted from the headend.

Noise or undesirable energy from one remote point can impair network return path communications for the entire network. Noise from one remote point may be combined or summed with the noise generated by other remote points. Typically, the combination or summation of the noise from multiple sources occurs at directional couplers along the return path. The directional couplers join together signals from separate branches of the network. Noise signals from one remote point at the same frequency as data signals from another remote end could be joined to the data signal at the coupler. Thus, signals transmitted by any remote point in the return direction can be affected by the combination or summation of the noise signals at the coupler. This phenomenon is referred to as noise funneling.

SOLUTION

A remote point comprises a plurality of user sites, such as a residences, and droplines connecting the user sites to a network tap. The network tap connects the remote point to a bidirectional cable communication network having a forward path carrying signals in a forward frequency band from a headend to remote points and a return path carrying signals in a return frequency band from the remote ends to the headend. The present invention suppresses noise energy in the return frequency band at the remote point before data signals are placed onto the network in the return frequency band. This enables the return data signals transmitted from each remote point user site to the headend to enjoy better integrity since the network return frequency band does not contain strong noise energy. Since noise energy in the return frequency band is not introduced by a remote point onto the network return path, return band noise signals from one remote point do not interfere with return band data signals transmitted from another remote point.

Strong noise energy in the network return frequency band is eliminated at the remote point. The present invention transmits data signals from a remote point user site to mixing tap circuitry. The data signals are transmitted to the mixing tap circuitry in a third band, such as 108–120 MHZ. A prybar signal is also transmitted from the user site with the data signals to the mixing tap circuitry. The third band data signals and prybar signals are applied to the mixing tap circuitry at the remote point before the remote point is connected to the network by a network tap. The prybar signal is received by a prybar detector in the mixing tap circuitry. When the prybar detector receives the prybar signal, the prybar detector activates a gated oscillator. The data signals are filtered by a band pass filter in the mixing tap circuitry to eliminate all signals outside the third band. The filtered signals are applied to a mixer. The mixer mixes the user site data signals with signals from the gated oscillator to convert the data signals in the third band to data signals in the return frequency band of the network. The network return band data signals pass through a band pass filter and to a diplex filter. The diplex filter allows only the network return frequency band to pass through the filter to the network tap. Data signals in the return band enter the network return path through the network tap and are carried to the headend.

Signals do not pass through the mixer unless the mixer receives both user transmitted data signals in the third band and the gated oscillation signals. The mixer needs both transmitted data signals and the gated oscillator signals to create the resulting network return band data signals. When the data signals are not being transmitted from a user site, noise from a user site cannot pass through the mixer. When a user site transmits data, it also generates the prybar signal to activate a gated oscillator in the mixing tap circuitry. The mixer receives the gated oscillator signals and mixes it with data signals in the third frequency band from the user site to convert the user site data signals to the return band. The data signals in the network return frequency band are applied to the network tap. The only noise which can pass through the mixer to the network tap is noise in the third band that the mixer receives from the remote end while receiving oscillation signals. A judicious selection of the third frequency band reduces the noise received with the data signals.

The apparatus and method of the preferred embodiment perform the above functions in the following manner. Signals from the headend are transmitted in a first "downstream" direction in a forward frequency band, such as 54–550 MHZ or 54–750 MHZ. User site data signals are sent by a user site to mixing tap circuitry in a third frequency band such as 108–120 MHZ. The user site also transmits a prybar signal to the mixing tap circuitry. A prybar detector in the mixing tap circuitry detects the prybar signals. A gated oscillator that produces signals at 90 MHZ is activated by the prybar detector. The user site data signals in the third band of 108–120 MHZ and the oscillation signals at 90 MHZ are applied to a mixer. The mixer mixes the user site data signals in the third band of 108–120 MHZ with the oscillator signals at 90 MHZ to produce data signals in the network return frequency band of 18–30 MHZ. The data signals in the return band of 18–30 MHZ are then applied to the network tap which transmits the return band data signals to headend via the return path of the network.

DETAILED DESCRIPTION

Figure 1:
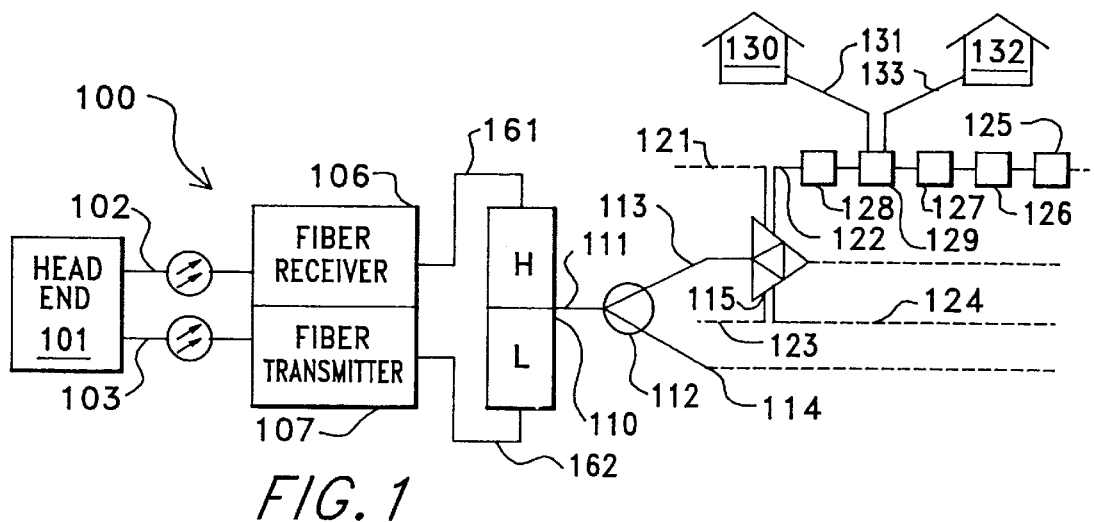
FIG. 1 illustrates a typical cable bidirectional communication network.

FIG. 1 illustrates a bidirectional cable communication network 100 which has a hybrid fiber coax tree and branch topology commonly found in the cable television industry. Headend 101 is the origination point for signals transmitted in a downstream direction and the termination point for signals transmitted in a return direction. Headend 101 transmits optical signals over fiber path 102 to fiber receiver 106. Fiber receiver 106 converts the optical signals to radio frequency (RF) signals in a forward frequency band. The RF signals are transmitted over path 161 to diplex filter 110. Fiber transmitter 107 receives RF signals in a return frequency band on path 162, converts the RF signals to optical signals, and transmits the optical signals to headend 101 on path 103.

Diplex filter 110 is a common diplex filter well known in the cable industry. The RF signals received over path 161 are filtered by filter 110 to allow only signals in the forward frequency band to be applied to coaxial cable 111 in the downstream direction. RF signals in the return frequency band received by diplex filter 110 from coaxial cable 111 are filtered and applied to path 162. Diplex filter 110 separates signals in the forward and return band. Path 162 carries the signals to fiber optical transmitter 107.

Coaxial cable 111 has one end connected to diplex filter 110 and has another end connected to directional coupler 112. A directional coupler is a commonly used device that splits and joins branches in bidirectional cable network. Directional coupler 112 splits the signals in the forward direction applied by coaxial cable 111 so that the information from headend 101 is applied to coaxial cables 113 and 114. RF signals in the return frequency band carried by coaxial cables 113 and 114 are joined at directional coupler 112 and applied over coaxial cable 111 to filter 110. Directional coupler 112 can also be incorporated into an amplifier.

Coaxial cable 113 is representative of the branches of the network 100. The forward direction signals are applied to amplifier/coupler 115 by coaxial cable 113. Amplifier/coupler 115 amplifies the signals received in both the forward and return band. The signals transmitted from headend 101 are also applied to separate branches, such as coaxial cables 121–124 by amplifier/coupler 115.

Coaxial cable 122 is representative of a branch from amplifier/coupler 115. Network taps 125–129 along coaxial cable 122 are typical network taps connecting remote point user sites to network 100. A remote point is a user site, such as a residence 130 and the dropline 131 that connects the user site to the network tap 129.

Figure 3:
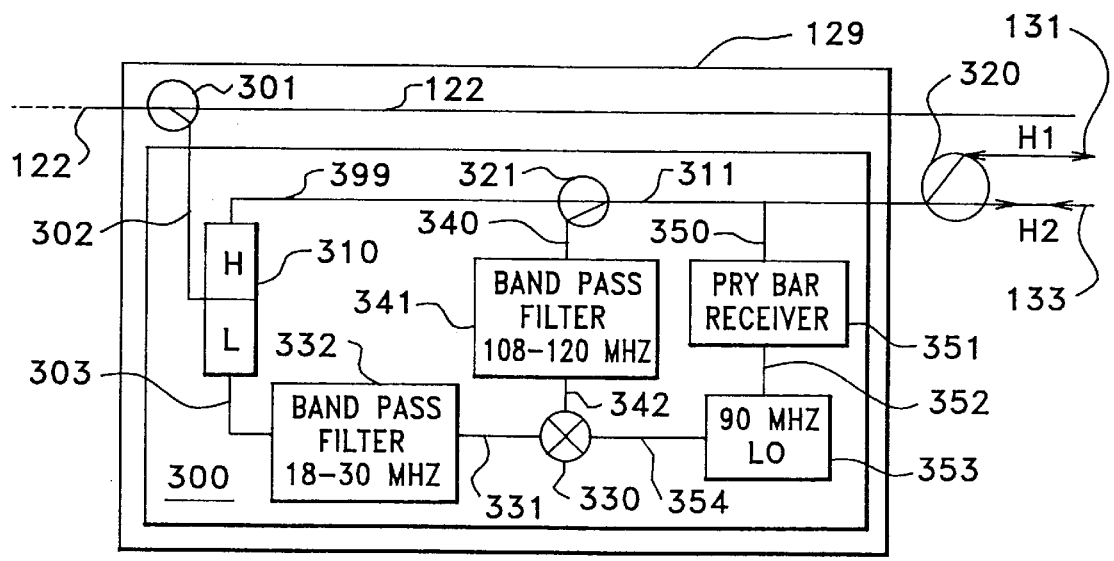
FIG. 3 illustrates mixing tap circuitry of the present invention.

FIG. 3 illustrates network tap 129. One end of path 302 is connected to coupler 301. Forward path signals carried by coaxial cable 122 are applied to path 302 by coupler 301. The other end of path 302 is connected to diplex filter 310. Diplex filter 310 allows forward band signals to pass to path 399. Path 399 applies the signals to coupler 321. Coupler 321 applies the forward band signals to coupler 320 via path 311. Droplines 131 and 133 receive the forward signals from coupler 320 and carry the forward band signals to user sites, such as residences 130 and 132.

Figure 2:
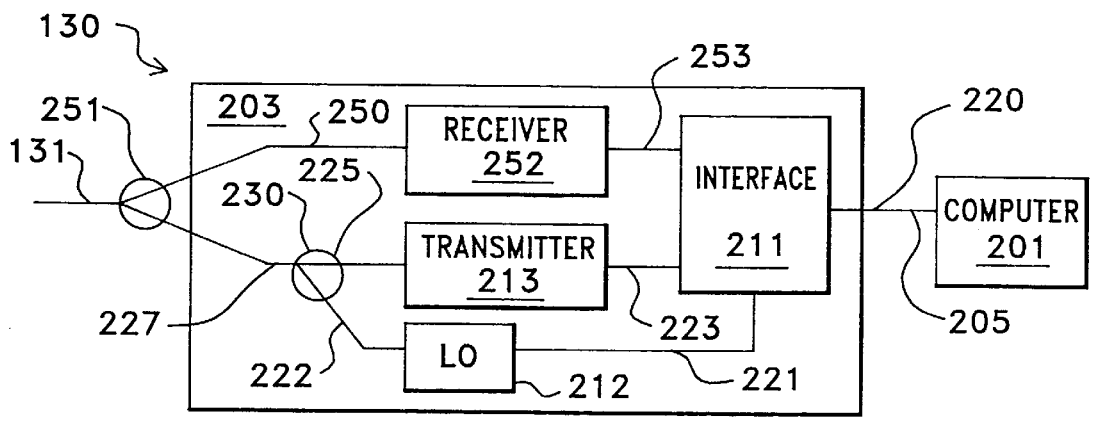
FIG. 2 illustrates a transmitter and receiver attached to a personal computer at a user site at the remote end.

Dropline 131 delivers the forward band signals to user site 130. FIG. 2 illustrates a personal computer 201 at user site 130. Other applications can include connecting television sets and telephones to the network. The forward path signals are split from dropline 131 at splitter 251 and applied to receiver 252 in network connection device 203 via path 250. Network connection device 203 is circuitry, such as an Ethernet card, connected to a computer to facilitate communication with the network. Receiver 252 applies received signals to interface 211 over path 253. Interface 211 converts the forward path signals to Ethernet signals capable of being received by computer 201 via path 220.

Computer 201 can also send data signals to headend 101. Ethernet signals are generated by computer 201 to transmit data to headend 101. Computer 201 transmits data signals to interface 211 in network connection device 203 via path 220. Interface 211 receives and converts the Ethernet data signals to RF signals. Usually, interface 211 converts the data signals from the Ethernet signals to RF signals in the return frequency band of the network at 5–40 MHZ. However, the present invention converts the data from Ethernet signals to RF signals in a third frequency band of 108–120 MHZ. In an alternate embodiment, a frequency band, such as 838–850 MHZ, is used as the third frequency band. The third band RF signals of 108–120 MHZ are applied to transmitter 213 via path 223. An activation signal is also transmitted by interface 211 to a prybar generator over path 221. The prybar generator 212 is activated by the reception of the activation signal and generates prybar signals. The prybar generator is a local oscillator 212 which applies the prybar signals to path 222. Local oscillator 212 transmits the prybar signals over path 222 and transmitter 213 transmits the data signals over path 225 to coupler 230 which joins the data and prybar signals and applies the joined signals to path 227, which carries the signals to splitter 251. The prybar and data signals are then applied to dropline 131.

Droplines 131 and 133 apply the RF signals in the third band of 108–120 MHZ from user sites 130 and 132 to tap 129 of FIG. 3. Mixing tap 300 is located in network tap 129 between coupler 320 connected to droplines 131/133 and coupler 301 connected to coaxial cable 122. User site data signals in the third frequency band of 108–120 MHZ transmitted from user sites 130 and 132 are applied to coupler 320 by droplines 131 and 133. Coupler 320 sums the user site signals in the third frequency band of 108–120 MHZ and applies the summed user site signals from the droplines 131/133 to path 311.

When two or more houses 130 and 132 are connected to mixing tap 300, the two houses 130 and 132 can transmit a prybar signal and data signals at the same time. These signals alternatively summed and canceled when joined by coupler 320. One solution is for interface 211 in both houses to contain circuitry (not shown) to detect signals reflected from mixing tap circuitry 300. If interface 211 does not detect a reflected signal, the data signals are transmitted from the house 130 or 132. A second embodiment is to have prybar signals that can be summed and still detected readily. A Pseudo-noise sequence can be used to produce signals that can be summed.

As path 311 enters mixing tap circuitry 300, a prybar detector 351 receives the signals from path 311 via path 350. When prybar detector 351 detects a transmitted prybar signal transmitted on path 350, an activation signal is transmitted from prybar detector 351 over path 352 to gated oscillator 353. Upon receiving the activation signal, gated oscillator 353 generates signals at a frequency, which mixes with each frequency in the third frequency band of 108–120 MHZ, to produce frequencies in the network return frequency band of 5–40 MHZ. In the preferred embodiment of the present invention, the oscillation signals produced by gated oscillator 353 are 90 MHZ. The 90 MHZ signals are then applied to path 354.

Figure 4:
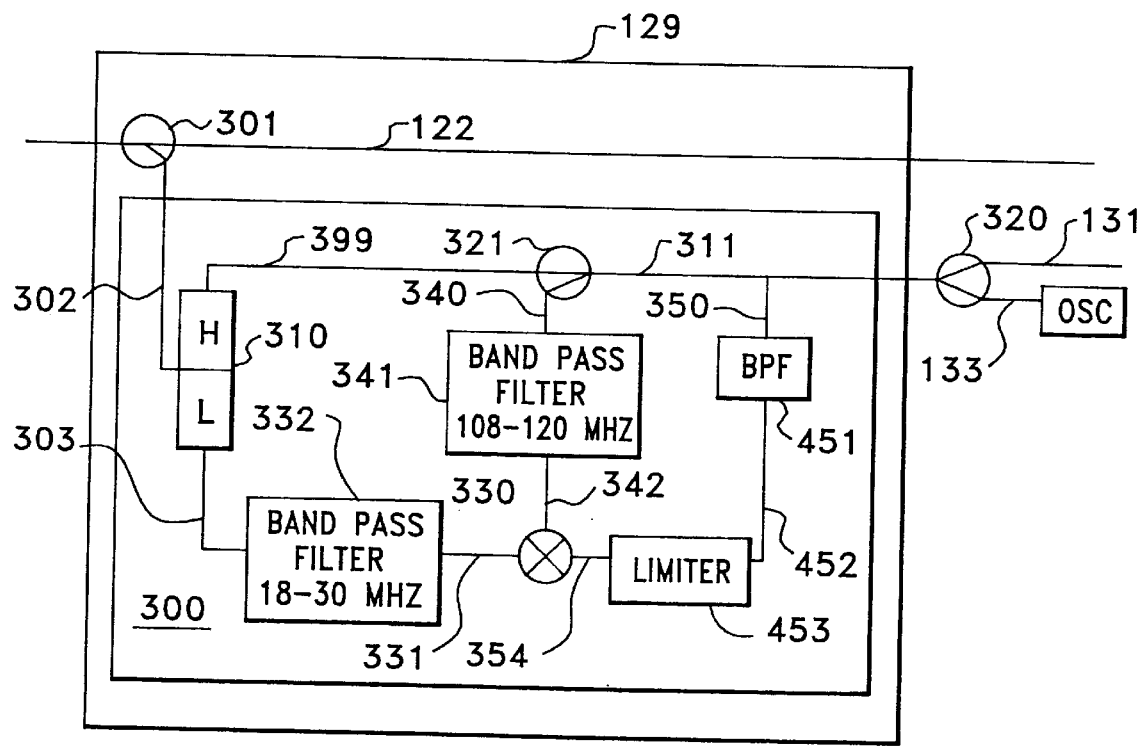
FIG. 4 illustrates an alternative embodiment of mixing tap circuitry.

In an alternative embodiment on FIG. 4, prybar receiver 351 and gated oscillator 353 are replaced by band pass filter 451 and limiter 453. Path 350 applies the prybar signal to band path filter 451. Band pass filter 451 allows only the prybar signal to pass from path 350 to path 452. The filtered signal is then passed to a limiter with one end connected to path 452. The limited signals are applied to limiter 453 and mixer 330 via path 354. Since the prybar signal is used to mix the signal, mixing tap circuitry 300 is a passive system and does not require power to operate.

Path 311 on FIG. 3 is connected to directional coupler 321. Data signals in the third frequency band of 108–120 MHZ carried by path 311 are applied to path 340 by coupler 321. Path 340 applies the data signals to band pass filter 341. Only signals in the third frequency band of 108–120 MHZ pass through band pass filter 341 to path 342. Noise and other undesirable energy signals in the return frequency band of 5–40 MHZ are filtered by band pass filter 341 to prevent extraneous signals from reaching mixer 300.

The data signals in the third frequency band of 108–120 MHZ are carried from band pass filter 341 to mixer 330 by path 342. Mixer 330 receives data signals in the third frequency band of 108–120 MHZ via path 342 and oscillation signals from gated oscillator 353 over path 354. The data signals are mixed with the oscillator signals from path 354 to produce data signals in the network return frequency band 5–40 MHZ. Thus, the data signals of 108–120 MHZ are converted to signals of 18–30 MHZ, which are within the network return frequency band of 5–40 MHZ, by mixing the signals at 108–120 MHZ with an oscillation signal of 90 MHZ. The mixer produces both summation signals and difference signals. In the preferred embodiment, the difference signals are in the network return frequency band and the summation signals are undesirable signals in a fourth frequency band of 198–210 MHZ. The signals produced by mixer 330 are then applied to filter 332 over path 331.

Only signals in the return frequency band of 18–30 MHZ pass through filter 332, all other signals including the summation signals produced by the mixer in the fourth frequency band of 198–210 MHZ are blocked. The signals in the return band of 18–30 MHZ are applied to diplex filter 310 via path 303.

Diplex filter 310 allows only signals in the return band of 5–40 MHZ to pass to path 302 from path 303. Path 302 applies the signals in the return band from mixing circuitry 300 to coupler 301. Coupler 301 then joins the return band signals to the signals in the return direction carried by coaxial cable 122.

Coaxial cable 122 carries the return direction signals to amplifier/coupler 115 on FIG. 1. The return direction signals are joined to the other return path signals by amplifier/coupler 115 and applied to the return path over coaxial cable 113. Coaxial cable 113 applies the return direction signals to directional coupler 112. Directional coupler 112 joins the return direction signals from coaxial cables 113 and 114. The joined signals are applied to coaxial cable 111. Coaxial cable 111 carries the return path signals diplex filter 110. Signals in the network return band of 5–40 MHZ pass through diplex filter 110 to path 162. Path 162 applies the return direction signals to fiber transmitter 107. The return direction signals are converted from RF signals to optical signals by fiber transmitter 107. The optical signals are then transmitted from fiber transmitter 107 to headend 101 over fiber path 103.

Since the noise and other undesirable energy from a remote point are eliminated from the return band before the data signals are placed in the return band, most of the undesirable noise is eliminated from data signals transmitted to the headend before the signals reach a branch of the network. The probability of data signals in the return band containing noise is decreased. Further, the probability of the noise signals being summed at the direction coupler decreases, thus the quality of the signals in the return band throughout the entire network increases.

The present invention relates to the suppressing of noise and other undesirable energy from signals from a remote end being transmitted to the headend of a bidirectional communication. The present invention suppresses the noise before the noise reaches a branch of the network. The components of the mixing tap are individually known and widely available in the cable industry from manufacturers/distributors including, but not limited to, General Instruments, Phillips Broadband, Eagle, and Scientific Atlanta. Although specific embodiments are disclosed for example herein, it is expected that persons skilled in the art can and will design alternative mixing tap circuitry that is within the scope of the following claims either literally or under the Doctrine of Equivalents.

I claim:

1. A bidirectional cable communication network in which a headend transmits signals in a forward frequency band to a remote end and said remote end transmits signals in a return frequency band to said headend, said bidirectional cable communication network comprising:

a mixing tap at said remote end;

a user site connected to said mixing tap;

means at said user site for generating data signals in a third frequency band; and said mixing tap comprising:
  first filter means;
  means for applying said data signals in said third frequency band from said user site to said first filter means;
  said first filter means being effective for passing only said data signals in said third frequency band;
  mixer means;
  mixer control signal generator means for applying a mixer control signal to said mixer means;
  means for applying said data signals in said third frequency band from said user site to said mixer means;
  said mixer means being responsive to said application of said data signals from said user site and said mixer control signal for converting said data signals in said third frequency band to data signals in said return frequency band;
  coupling means connecting said mixing tap to said network;
  means for applying said data signals in said return frequency band to coupling means; and
  said coupling means being responsive to said application of said data signals in said return frequency band for transmitting said data signals in said return frequency band to said headend.

2. The bidirectional communication network of claim 1, wherein said mixer control signal generator means comprises:
  a local oscillator at said user site for generating oscillation signals responsive to said transmitting of said data signals in said third frequency band;
  means at said user site for transmitting said oscillation signals to said mixing tap;
  oscillation filter means in said mixing tap;
  means for applying said oscillation signals to said oscillation filter means;
  said filter means being effective for passing only said oscillation signals;
  a limiter means in said mixing tap;
  means for applying said oscillation signals to said limiter means;
  said limiter means being effective for limiting said oscillation signals to a range between a maximum and a minimum amplitude; and
  means for applying said limited oscillation signals to said mixer means.

3. The bidirectional communication network of claim 1 wherein said mixer control signal generator means comprises:
  means at said user site for generating a prybar signal responsive to said transmitting of said data signals in said third frequency band;
  means at said user site for transmitting said prybar signal to said mixing tap with said data signals in said third frequency band;
  prybar detecting means in said mixing tap;
  means for applying said prybar signal from said user site to said prybar detecting means;
  a local oscillator;
  said prybar detecting means being responsive to said application of said prybar signal for applying activation signals to said local oscillator for generating oscillation signals; and
  means for applying said oscillation signals to said mixer means.

4. The bidirectional communication network of claim 1 wherein said mixing tap further comprises:
  second filter means;
  means for applying said data signals in said return frequency band to said second filter means; and
  said second filter means being effective for passing only said data signals in said return frequency band.

5. The bidirectional communication network of claim 1 wherein said mixing tap further comprises:
  a diplex filter means;
  means for applying signals in forward frequency band from said headend to said diplex filter means;
  said diplex filter means being effective for passing only said signals from said headend;
  means for applying said data signals in said return frequency band to said diplex filter means; and
  said diplex filter means being responsive to said application of said data signals in said return frequency band for passing only data signals in said return frequency band.

6. The bidirectional communication network of claim 1 wherein said mixing tap further comprises:
  coupling means connecting a plurality of user sites to said mixing tap.

7. The bidirectional communication network of claim 1 further comprising:
  means for detecting a reflection of a prybar signal at said user site; and
  said means for transmitting transmits responsive to an absence of said reflection.

8. The bidirectional communication network of claim 1 wherein a plurality of user sites are connected to said mixing tap, further comprising:
  means at each said user site for transmitting a unique prybar signal that can be summed with prybar signals for other user sites of said plurality of user sites.

9. A method for suppressing noise in a bidirectional communication network in which a headend transmits signals in a forward frequency band to a remote end and said remote end transmits signals in a return frequency band to said headend, said method for suppressing comprising the steps of:
  generating data signals in a third frequency band at a user site of said remote end;
  applying said data signals in said third frequency band from said user site to a filter in a mixing tap;
  filtering said data signals with said filter to pass only data signals in said third frequency band;
  generating a mixer control signal;
  applying said mixer control signal to a mixer in said mixing tap;
  applying said data signals from said user site in said third frequency band to said mixer from said filter in said mixing tap;
  converting said data signals in said third frequency band to data signals in said return frequency band with said mixer using said mixer control signal; and
  transmitting said data signals in said return frequency band from said mixing tap to said headend.

10. The method of claim 9, wherein said step of generating said mixer control signal comprises the steps of:

generating oscillation signals from a local oscillator at said user site;

applying said oscillation signals to a filter in said mixing tap;

filtering said oscillation signals to allow only said oscillation signals to pass with said filter;

limiting said oscillation signals; and applying said oscillation signals to said mixer.

11. The method of claim 9, wherein said step of generating said mixer control signal comprises the steps of:

generating a prybar signal at said user site;

applying said prybar signal to a prybar detector in said mixing tap;

generating an activation signal in said prybar detector responsive to a detection of said prybar signal;

applying said activation signal to a local oscillator in said mixing tap;

generating oscillation signals with said local oscillator; and applying said oscillation signals from said local oscillator to said mixer.

12. The method of claim 9 further comprising the step of:

filtering said data signals in said return frequency band transmitted to said headend with a second filter connected to said mixer to pass only said data signals in said return frequency band.

13. The method of claim 9 further comprising the steps of:

filtering said signals in said forward frequency band with a diplex filter to pass only said signals in said forward frequency band to said remote end; and filtering said data signals in said return frequency band with said diplex filter to pass only data signals in said return frequency band to said headend.

14. The method of claim 9 further comprising the step of:

transmitting data signals and a prybar signal from one of a plurality of user sites connected to said mixing tap.

15. The method of claim 9 wherein a plurality of user sites are connected at one remote end further comprising the steps of:

detecting a reflection a prybar signal at said plurality of user sites; and transmitting said data signal and said prybar signal responsive to an absence of said reflection.

16. The method of claim 9 wherein a plurality of user sites are connected at one remote end further comprising the step of:

generating a unique prybar signal at each of said plurality of user sites that can be summed with and detected from other prybar signals.

* * * * *